(12) United States Patent
Kim

(10) Patent No.: US 6,520,566 B2
(45) Date of Patent: Feb. 18, 2003

(54) STRUCTURE COUPLING A CRASH PAD ASSEMBLY AND A COWL PAD ASSEMBLY OF A VEHICLE

(75) Inventor: Jong-Soo Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/880,161

(22) Filed: Jun. 11, 2001

(65) Prior Publication Data

US 2002/0060475 A1 May 23, 2002

(30) Foreign Application Priority Data

Nov. 23, 2000 (KR) ........................................ 2000-69967

(51) Int. Cl.⁷ .............................................. B62D 25/14
(52) U.S. Cl. ......................................... 296/192; 296/72
(58) Field of Search ............................... 296/72, 70, 29, 296/192; 24/297; 411/508; 280/752

(56) References Cited

U.S. PATENT DOCUMENTS

| 4,146,263 A | * | 3/1979 | Watari |
| 6,132,154 A | * | 10/2000 | Easter ...................... 296/72 X |
| 2002/0014788 A1 | * | 2/2002 | Fujita et al. ................ 296/192 |

FOREIGN PATENT DOCUMENTS

| JP | 5-278635 | * 10/1993 |
| JP | 6-227432 | * 8/1994 |

* cited by examiner

Primary Examiner—Joseph D. Pape
(74) Attorney, Agent, or Firm—Christie, Parker & Hale, LLP

(57) ABSTRACT

A structure of a crash pad assembly and a cowl panel assembly for a vehicle, in which a crash pad mounting clip is thermally fused with a flange of the crash pad assembly, and, at the same time, a flange of the cowl panel assembly is inserted into the crash pad mounting clip, resulting in reduction in the number of assembling steps to improve workers' job efficiency and decrease the total manufacturing cost for better quality products.

5 Claims, 7 Drawing Sheets

STRUCTURE COUPLING A CRASH PAD ASSEMBLY AND A COWL PAD ASSEMBLY OF A VEHICLE

CROSS-REFERENCE TO RELATED APPLICATION

This application claims priority of Korea patent Application No. 2000-69967, filed on Nov. 23, 2000.

BACKGROUND OF THE INVENTION

1. Field of the Invention

The present invention relates to an assemble structure of crash pad assembly and cowl panel assembly for vehicle and more particularly to an assemble structure of crash pad assembly and cowl panel assembly for vehicle adapted to improve convenience of workers' assembling operations, but to cut down total assembling cost.

2. Description of the Invention

Generally, a crash pad assembly 1, also called dash panel assembly or instrument panel assembly, is, as shown in FIG. 1, air tightly fastened onto an internal surface of a front glass 2. The end of the front glass 2 is also air tightly coupled with that of the cowl top panel 3. An upper part of a cowl panel assembly 4 is fastened with an internal surface of the end of the front glass 2 for air tightness.

On the other hand, at the upper part of the cowl panel assembly 4, as shown in FIGS. 1 and 2, a plurality of crash pad mounting brackets 5 are welded for air tight fixation with one end being extended and bent down toward flanges 1a of the crash pad assembly 1.

In general, there are fastened five crash pad mounting brackets 5, though slightly different depending on the type of vehicles, keeping them at a predetermined constant interval therebetween to cover the whole length of the cowl panel assembly 4.

Furthermore, the crash pad assembly 1 and the cowl panel assembly 4 are fastened by a crash pad mounting clip 6, one end of which is screwed with the flange 1a of the crash pad assembly 1 and the other end of which is inserted into an assembling hole 5a of the crash pad mounting brackets 5.

In other words, a plurality of flanges 1a are integrated at the internal side of the crash pad assembly 1 with their ends being directed toward the cowl panel assembly 4, and there is a predetermined size of assembling openings 1b being formed between the flanges 1a of the crash pad assembly 1.

In addition, the crash pad mounting clip 6, as shown in FIG. 3, is constructed with: a screw fastening part 6a to be tightly fixed at the flange 1a of the crash pad assembly 1 by a screw 7 that will be fastened into the groove 1b an insertion protruder 6b protruded at the front side of the screw fastening part 6a to be inserted into the assembling hole 5a of the crash pad mounting bracket 5; and a supporting part 6c integrally formed at the external circumference of the insertion protruder 6b, apart from the screw fastening part 6a, to be closely attached to the front side of the crash pad mounting bracket 5 when the insertion protruder 6b is inserted into the assembling hole 5a.

On the other hand, a predetermined size of a screw hole 6d is formed at the screw fastening part 6a for penetration of the screw 7.

As a result, a plurality of crash pad mounting brackets 5 are tightly fastened onto the cowl panel assembly 4, and a screw is utilized to assemble the screw fastening part 6a of the crash pad mounting clip 6 into the flange 1a of the crash pad assembly 1. Then, the insertion protruder 6b of the crash pad mounting clip 6 is inserted into the assembling hole 5a of the crash pad mounting bracket 5, so that the crash pad assembly 1 and the cowl panel assembly 4 are completely assembled by means of the crash pad mounting brackets 5 and crash pad mounting clip 6.

However, according to the conventional assembled structure described above, since the crash pad mounting brackets 5 should be welded onto the cowl panel assembly 4 and the screw fastening part 6a of the crash pad mounting clip 6 is assembled to the flange 1a by the screw 7, there are problems such as an increase in the number of assembling steps, a reduction in the job efficiency and a general increase in total manufacturing cost.

SUMMARY OF THE INVENTION

It is an object of the present invention to solve the aforementioned problems and provide an assemble structure of crash pad assembly and cowl panel assembly for vehicle by using a crash pad mounting clip that will be fastened with a flange of crash pad assembly by ultrasonic thermal fusion and, at the same time, inserted and fastened into a flange of a cowl panel assembly, thereby improving workers' job convenience but reducing general assembling cost through a reduction in the number of assembling steps to completely assemble the crash pad assembly and the cowl panel assembly.

In order to accomplish the aforementioned object of the present invention, there is provided an assemble structure of crash pad assembly and cowl panel assembly of vehicle, in which a crash pad mounting clip is fastened at the flange of the crash pad assembly through thermal fusion and, at the same time, a flange of the cowl panel assembly is inserted into the crash pad mounting clip.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

The present invention will be described in detail with reference to the accompanying drawings.

Figure 4:
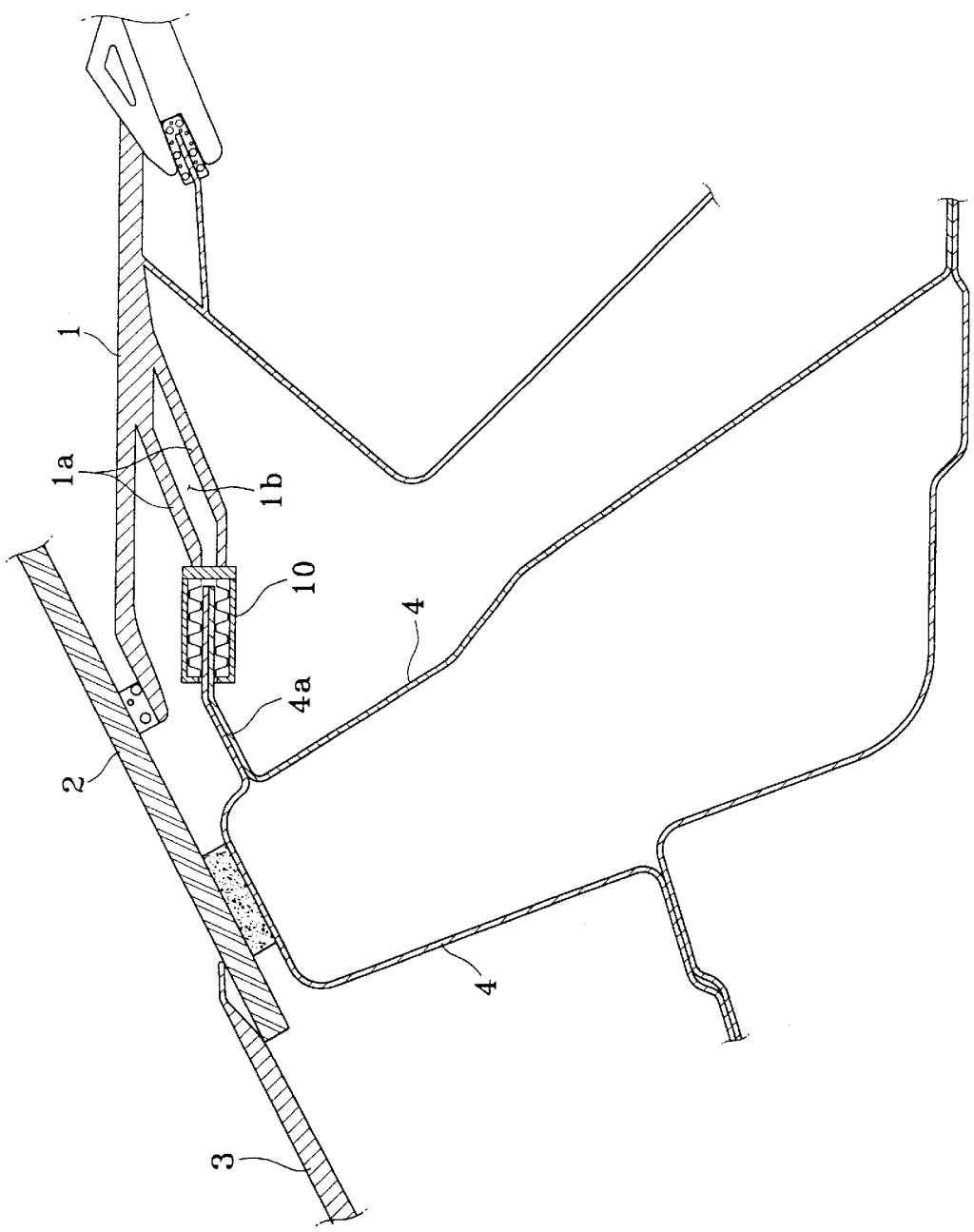
FIG. 4 is a schematic, vertical, cross-sectional view for illustrating an assemble structure of crash pad assembly and cowl panel assembly in accordance with the present invention.

FIG. 4 is a schematic, vertical, cross-sectional view for illustrating an assemble structure of crash pad assembly and cowl panel assembly for a vehicle. Throughout the drawings, it should be noted that the same or similar reference numerals are used for designation of like or equalizers or portion for simplicity of illustration and explanation for convenient description and understanding.

According to the present invention, a crash pad assembly 1 is, as shown in FIG. 4, fastened onto an internal surface of a front glass 2 for air tightness. The end of the front glass 2 is coupled with that of a cowl top panel 3 for air tightness. An upper part of a cowl panel assembly 4 is air tightly fastened with an internal surface of the end of the front glass 2.

In addition, flanges 1a integrally formed at the lower surface of the crash pad assembly 1 with an end being directed toward the cowl panel assembly 4, while a flange 4a of the cowl panel assembly 4 is formed with one end being directed toward the flange 1a of the crash pad assembly 1.

Furthermore, the crash pad assembly 1 and the cowl panel assembly 4 are assembled by means of a crash pad mounting clip 10 both ends of which are fastened onto the flanges 1a, 4a of the crash pad assembly 1 and cowl panel assembly 4.

Figure 5:
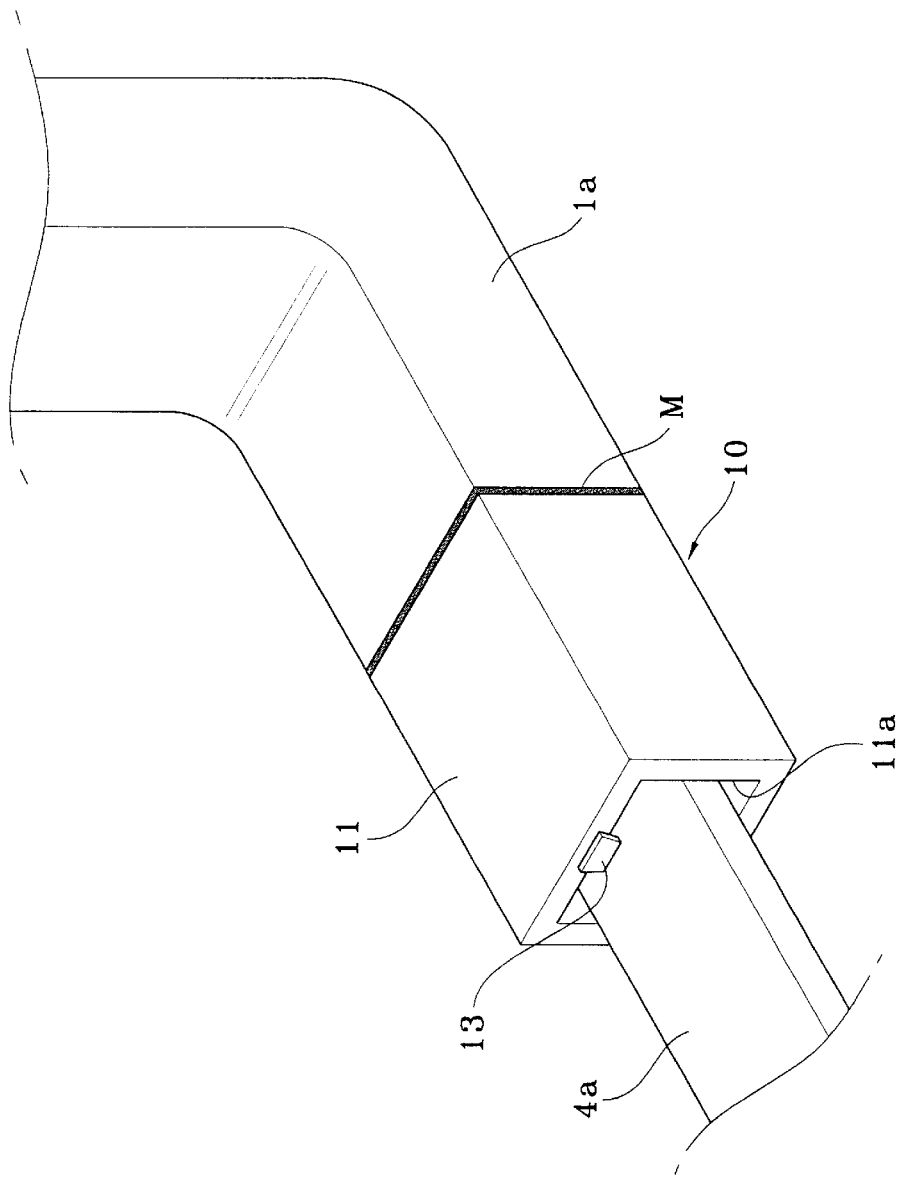
FIG. 5 is a schematic, enlarged, perspective view for illustrating a structure in which flanges of crash pad assembly and cowl panel assembly are assembled by means of a crash pad mounting clip in accordance with the present invention.

In other words, as shown in FIG. 5, an end of the crash pad mounting clip 10 is fastened onto the flange 1a of the crash pad assembly 1 through thermal fusion, and the flange 4a of the cowl panel assembly 4 is inserted into the other end of the crash pad mounting clip 10, thereby completing an assembled structure of the crash pad assembly 1 and the cowl panel assembly 4.

Figure 6:
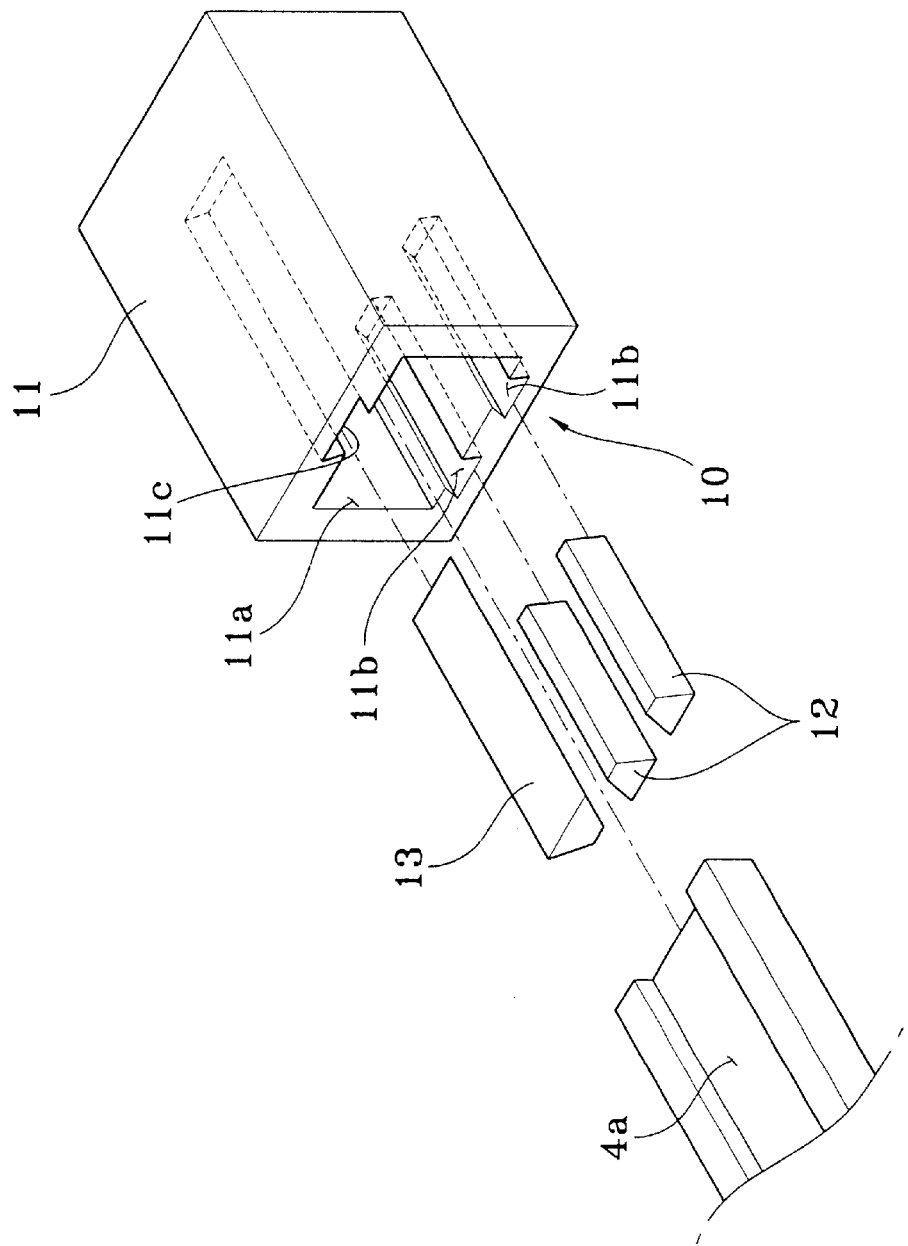
FIG. 6 is an analyzed, perspective view for illustrating a crash pad mounting clip in accordance with the present invention.
Figure 7:
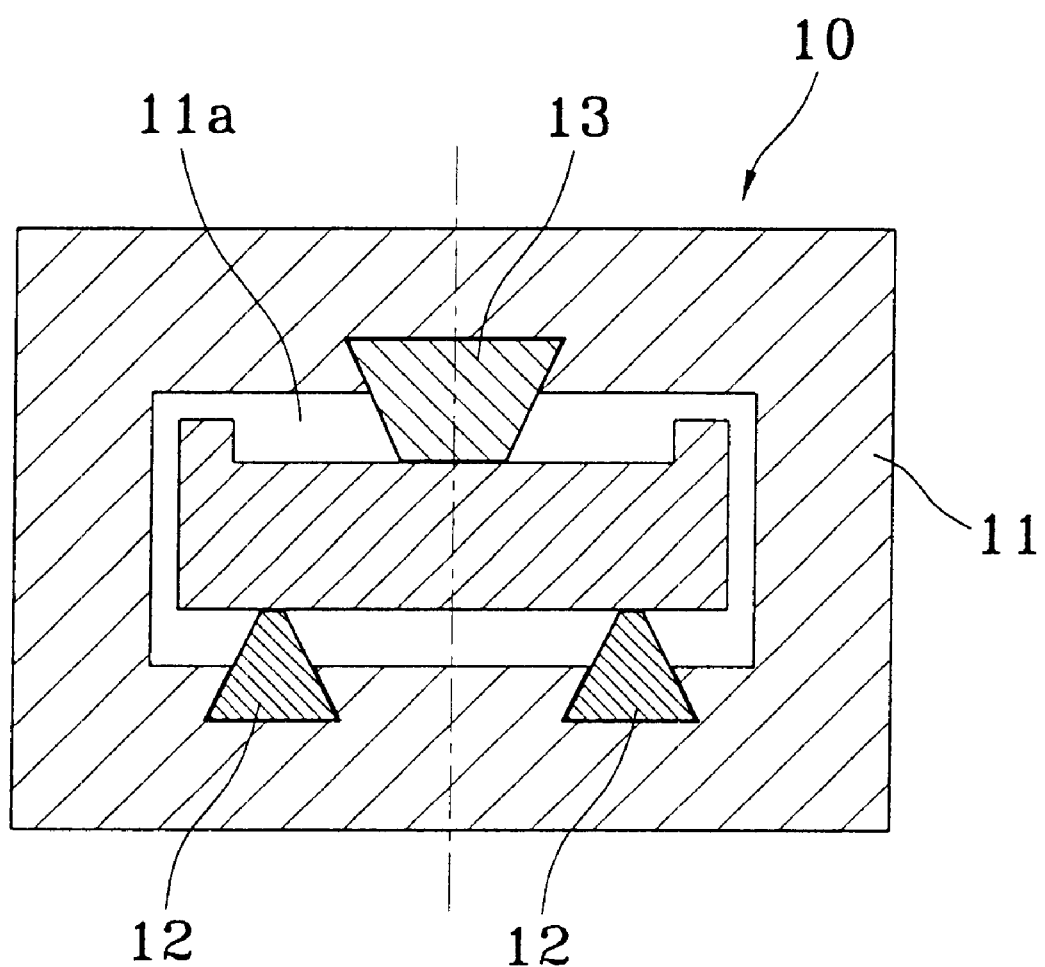
FIG. 7 is a vertical, cross-sectional view for illustrating a structure in which a flange of a cowl panel assembly is inserted into a crash pad mounting clip in accordance with the present invention.

At this time, the crash pad mounting clip 10, as shown in FIGS. 5 through 7, is constructed with: a case member 11, one side of which faces the flange 1a of the crash pad assembly 1 being firmly fixed through thermal fusion of an ultrasonic welding process, also including an assembling opening 11a with one end of which faces the flange 4a of the cowl panel assembly 4 being open and a plurality of lower and upper fastening grooves 11b, 11c formed lengthwise at the top and bottom portions of the assembling opening 11a; a plurality of lower fixing member 12 to get inserted into the lower fastening groove 11b for supporting the flange 4a of the cowl panel assembly 4 from the bottom; and an upper fixing member 13 to be inserted into the upper fixing groove 11c for supporting the flange 4a of the cowl panel assembly 4 from the top.

On the other hand, there are two lower fastening grooves 11b at the bottom surface of the assembling opening 11a being apart at a predetermined gap therebetween, while there is an upper fastening groove 11c at the top surface of the assembling opening 11a, lengthwise between the lower fastening grooves 11b.

At this time, the upper fastening groove 11c is formed longer than the lower fastening grooves 11b, so that it may play a role as a guide when the upper fastening member 13 inserted into the upper fastening groove 11c is inserted into the flange 4a of the cowl panel assembly 4.

In addition, the case member 11 is injection-molded from a kind of plastic material for easy thermal fusion onto the flange 1a of the crash pad assembly 1 by an ultrasonic welding step. The lower and upper fixing members 12, 13 are made of steel to convenient support the top and bottom surfaces of the flange 4a of the cowl panel assembly 4.

Furthermore, an unexplained reference numeral M in FIG. 5 indicates a part where the ultrasonic welding process is performed to thermally fuse the flange 1a of the crash pad assembly 1 and the case member 11 of the crash pad mounting clip 10.

Thus, the case member 11 of the crash pad mounting clip 10 is tightly attached to the flange 1a of the crash pad assembly 1 and, then, assembled therebetween through thermal fusion by the ultrasonic welding process. Next, the flange 4a of the cowl panel assembly 4 is inserted into the assembling opening 11a of the case member 11. As a result, the top and bottom surfaces of the flange 4a of the cowl panel assembly 4 are firmly supported by the lower and upper fixing members 12, 13, so that the crash pad assembly 1 and the cowl panel assembly 4 are simply assembled by means of the crash pad mounting pad 10.

Figure 1:
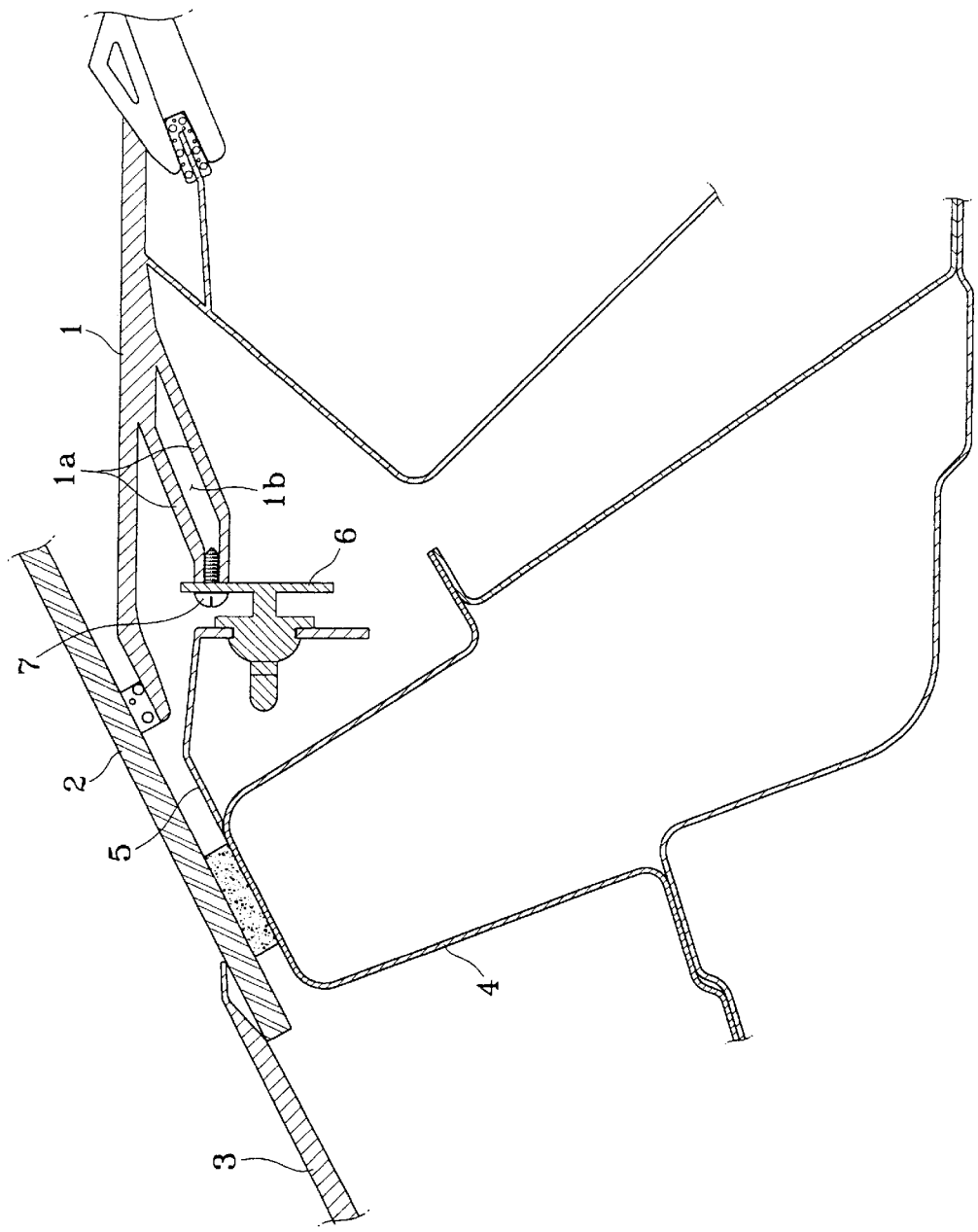
FIG. 1 is a schematic, vertical, cross-sectional view for illustrating an assemble structure of crash pad assembly and cowl panel assembly in accordance with the prior art.
Figure 2:
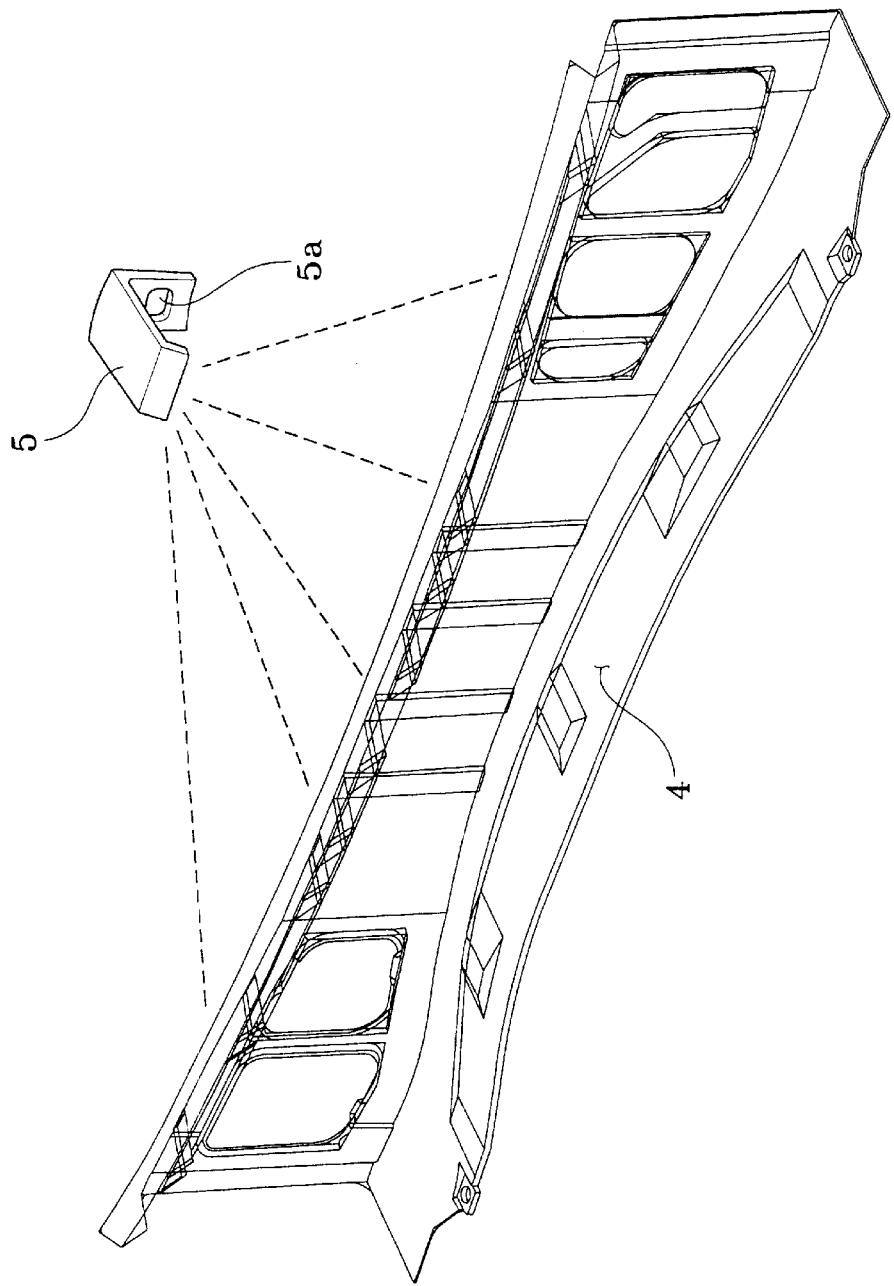
FIG. 2 is an analyzed perspective view for illustrating installation of conventional crash pad mounting brackets in a cowl panel assembly.
Figure 3:
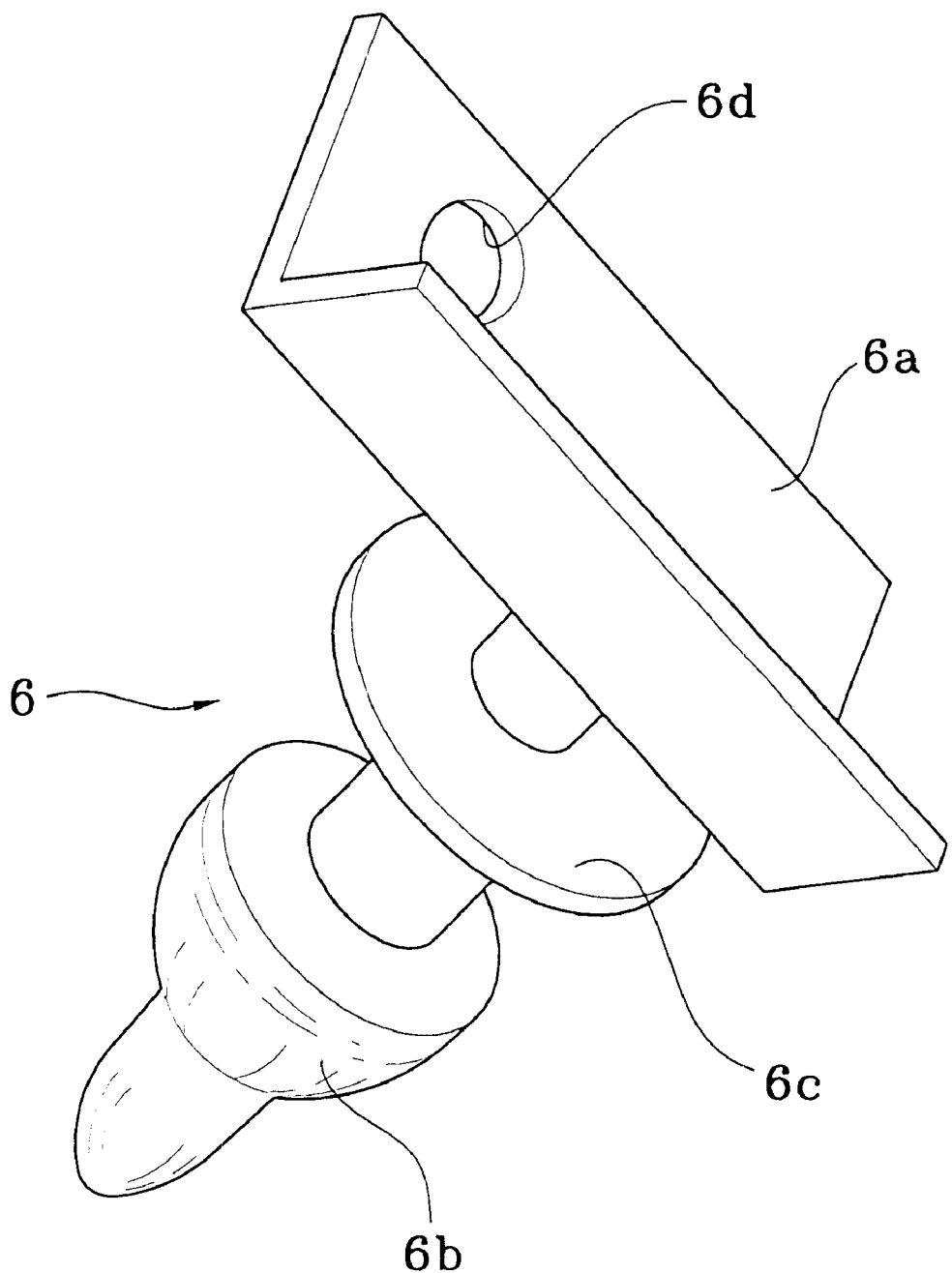
FIG. 3 is a perspective view for illustrating a crash pad mounting clip in the prior art.

In other words, the flange 1a of the crash pad assembly 1 is fastened through thermal fusion by the ultrasonic welding step with one end of the crash pad mounting clip 10 and, at the same time, the flange 4a of the cowl panel assembly 4 is inserted into the other end of the crash pad mounting clip 10. The assembled structure of the crash pad assembly 1 and the cowl panel assembly 4 in the present invention, compared with FIG. 1, shows a reduction in the number of assembling steps, thereby improving workers' job efficiency and decreasing the total manufacturing cost for superior quality of products.

As described above, since the crash pad assembly and the cowl panel assembly are fastened by means of the crash pad mounting clip, an end of which is thermally fused by an ultrasonic welding step with the flange of the crash pad assembly, and, at the same time, the flange of the cowl panel assembly is inserted into the other end of the crash pad mounting clip, there are advantages in the crash pad assembly and cowl panel assembly structure of the present invention such as a reduction in the number of assembling steps to improve workers' job efficiency and decrease the total manufacturing cost for better quality products.

What is claimed is:

1. A structure coupling a crash pad assembly having a flange and a cowl panel assembly having a flange, the structure comprising:
    a crash pad mounting clip thermally fused to the flange of the crash pad assembly, wherein the flange of the cowl panel assembly is inserted into the crash pad mounting clip, wherein the mounting clip comprises,
        a casing member comprising,
            a first side facing the flange of the crash pad assembly,
            an assembling opening facing the flange of the cowl panel assembly, and
            an upper fastening groove formed lengthwise within the assembling opening,
            a lower fastening groove formed lengthwise within the assembling opening,
            an upper fixing member inserted into the upper fastening groove supporting the flange of the cowl panel assembly, and
            a lower fixing member inserted into the lower fastening groove supporting the flange of the cowl panel assembly.

2. A structure as recited in claim 1 wherein the casing member comprises two lower fastening grooves and two lower fixing members, each inserted into one of the two lower fastening grooves.

3. A structure as recited in claim 2 wherein the upper fastening groove is located between the two lower fastening grooves.

4. A structure as recited in claim 2 wherein the upper fastening groove has a length and wherein each of the lower grooves has a length, wherein the length of the upper fastening groove is greater than the length of each lower fastening groove.

5. A structure as recited in claim 1 wherein the crash pad mounting clip is thermally fused to the flange of the crash pad assembly using an ultrasonic process.

* * * * *